US008595555B1

(12) United States Patent
Taylor

(10) Patent No.: US 8,595,555 B1
(45) Date of Patent: Nov. 26, 2013

(54) DEBUGGING AN INTEGRATED CIRCUIT WITH AN EMBEDDED PROCESSOR

(75) Inventor: Bradley L. Taylor, Santa Cruz, CA (US)

(73) Assignee: Xilinx, Inc., San Jose, CA (US)

( * ) Notice: Subject to any disclaimer, the term of this patent is extended or adjusted under 35 U.S.C. 154(b) by 398 days.

(21) Appl. No.: 13/005,941

(22) Filed: Jan. 13, 2011

(51) Int. Cl.
*G06F 11/00* (2006.01)

(52) U.S. Cl.
USPC .......................................................... 714/30

(58) Field of Classification Search
USPC .......................................................... 714/30
See application file for complete search history.

(56) References Cited

U.S. PATENT DOCUMENTS

| | | | |
|---|---|---|---|
| 5,581,482 A | 12/1996 | Wiedenman et al. | |
| 5,835,702 A | 11/1998 | Levine et al. | |
| 5,867,644 A | 2/1999 | Ranson et al. | |
| 6,351,724 B1 | 2/2002 | Klassen et al. | |
| 7,308,564 B1 * | 12/2007 | Jenkins, IV | 712/227 |
| 7,913,123 B2 | 3/2011 | Al-Omari et al. | |
| 7,979,750 B2 | 7/2011 | Al-Omari et al. | |
| 8,327,200 B1 | 12/2012 | Mohan | |
| 2003/0110430 A1 | 6/2003 | Bailis et al. | |
| 2003/0163298 A1 | 8/2003 | Odom et al. | |
| 2007/0168749 A1 | 7/2007 | Stewart et al. | |
| 2008/0239082 A1* | 10/2008 | Zhu et al. | 348/181 |
| 2009/0007076 A1 | 1/2009 | Al-Omari et al. | |

OTHER PUBLICATIONS

U.S. Appl. No. 12/913,713, Lu, Ting, et al., filed Oct. 27, 2010, Xilinx, Inc., 2100 Logic Drive, San Jose, CA 95124 USA.
U.S. Appl. No. 13/005,962, Taylor, Bradley, L., et al., filed Jan. 13, 2011, Xilinx, Inc., 2100 Logic Drive, San Jose, CA 95124 USA.
U.S. Appl. No. 13/005,994, Taylor, Bradley, L., et al., filed Jan. 13, 2011, Xilinx, Inc., 2100 Logic Drive, San Jose, CA 95124 USA.
Nass, Rich, "Xilinx puts ARM Core into its FPGAs", EE Times, 2 pp., Apr. 27, 2010, available at http://www.eetimes.com/electronics-products/processors/4115523/Xilinx-puts-ARM-core-into-its-FPGA.
Taylor, Brad and Wittig, Ralph, "28nm Generation Programmable Families", 7 Series FPGAs, Extensible Processing Platform Family, AMBA AX14 IP, Aug. 8, 2010, pp. 1-25, Xilinx, 2100 Logic Drive, San Jose, CA 95124.

* cited by examiner

*Primary Examiner* — Bryce Bonzo
(74) *Attorney, Agent, or Firm* — Kevin T. Cuenot

(57) ABSTRACT

A method of debugging an integrated circuit (IC) can include receiving, within a debugging system implemented within the IC, a debug command from a system external to the IC and, responsive to the debug command, initiating a debug function specified by the debug command for a processor system embedded on the IC. An IC also is provided that can include a programmable circuitry (e.g., a programmable fabric) coupled via an interface to processor system embedded in the IC. A debugging system can be implemented within the programmable fabric to communicate with the processor system via the interface.

18 Claims, 4 Drawing Sheets

DEBUGGING AN INTEGRATED CIRCUIT WITH AN EMBEDDED PROCESSOR

FIELD OF THE INVENTION

One or more embodiments disclosed within this specification relate to integrated circuits (ICs). More particularly, one or more embodiments relate to debugging within an IC that includes an embedded processor.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable circuit elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA. Accordingly, the loading of first configuration data specifying a first circuit design into the programmable IC results in implementation of first physical circuitry within the programmable IC. The loading of second configuration data specifying a second circuit design that is different from the first circuit design results in implementation of second physical circuitry within the programmable IC that is different from the first physical circuitry.

Another type of IC that can be programmed is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these ICs that can be programmed, the functionality and physical circuitry that is implemented within the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other ICs can be programmed by applying a processing layer, such as a metal layer, that programmably interconnects the various elements on the device. These programmable ICs are also known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Some modern ICs, including some of the varieties of ICs discussed above, can include an embedded processor that is capable of executing program code. It should be appreciated that execution of program code within a processor is distinguishable from "programming" or "configuring" an IC where the act of programming or configuring the IC results in different physical circuitry. The processor can be fabricated as part of the same die that includes the programmable logic circuitry and the programmable interconnect circuitry, also referred to as the "programmable fabric" of the IC. The inclusion of a processor within an IC can significantly increase the complexity of the overall device, resulting in the need for improved debugging capabilities.

SUMMARY

One or more embodiments disclosed within this specification relate to integrated circuits (ICs) and, more particularly, to debugging a processor that is embedded within an IC.

An embodiment can include a method of debugging an IC. The method can include receiving, within a debugging system implemented within the IC, a debug command from a system external to the IC and, responsive to the debug command, initiating a debug function specified by the debug command for a processor system embedded on the IC.

Another embodiment can include an IC having a programmable circuitry configurable to implement physical circuits. The IC also can include a processor system. The processor system can be hard-wired. The IC can include an interface configured to couple the programmable circuitry with the processor system. The interface can provide the programmable circuitry with direct access to at least one internal component of the processor system.

Another embodiment can include an IC having a programmable fabric configurable to implement physical circuits and a configuration controller. The configuration controller can receive configuration data specifying physical circuits for implementation within the programmable fabric. The IC also can include a processor system that can be hard-wired. An interface can be included that is configured to couple the programmable fabric with the processor system. The configuration controller can implement a debugging system for the processor system within the programmable fabric responsive to receiving configuration data specifying the debugging system. Once implemented within the programmable fabric, the debugging system, for example, can communicate with the processor system via the interface.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to integrated circuits (ICs) and, more particularly, to debugging within an IC that includes a processor system. An IC can be implemented to include a processor system that is coupled to a programmable fabric portion. Within the programmable fabric portion, a debugging system can be implemented. The debugging system can include one or more modules that can interact with the processor system. The debugging system can facilitate debugging of the processor system via one or more dedicated interfaces that couple the processor system with the programmable fabric and circuits and/or systems implemented therein.

Figure 1:
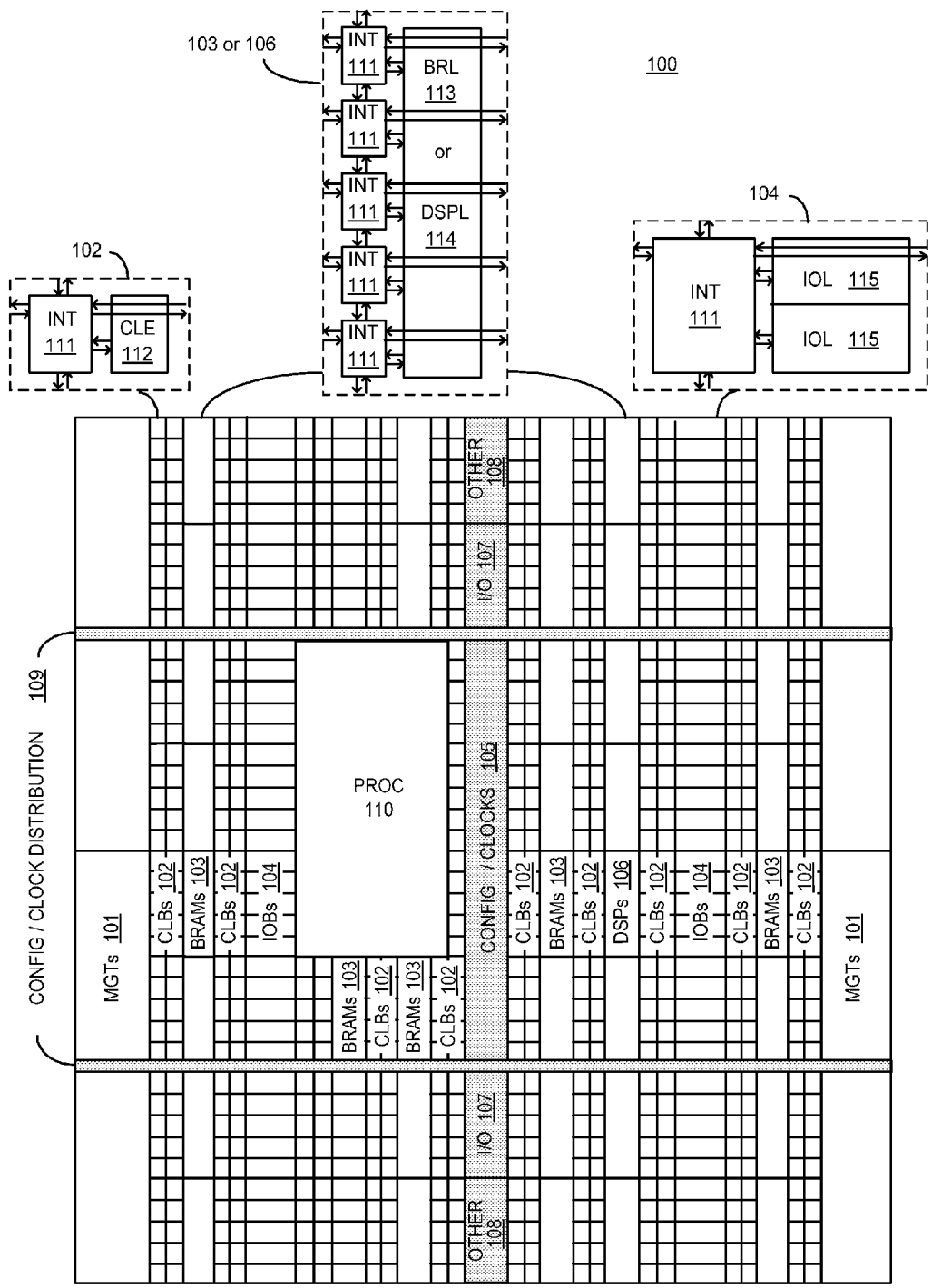
FIG. 1 is a first block diagram illustrating an architecture for an integrated circuit (IC) in accordance with an embodiment disclosed within this specification.

FIG. 1 is a first block diagram illustrating an architecture 100 for an IC in accordance with an embodiment disclosed within this specification. Architecture 100 can be implemented within a field programmable gate array (FPGA) type of IC, for example. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth.

In some programmable ICs, each programmable tile includes a programmable interconnect element (INT) 111 having standardized connections to and from a corresponding interconnect element in each adjacent tile. Therefore, the programmable interconnect elements, taken together, implement the programmable interconnect structure for the illustrated IC. The INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of INTs 111. An IOB 104 can include, for example, two instances of an input/output logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die (shown shaded in FIG. 1) is used for configuration, clock, and other control logic. Horizontal areas 109 extending from this column are used to distribute the clocks and configuration signals across the breadth of the programmable IC.

Some programmable ICs utilizing the architecture illustrated in FIG. 1 include additional logic blocks that disrupt the regular columnar structure making up a large part of the programmable IC. The additional logic blocks can be programmable blocks and/or dedicated circuitry. For example, a processor block depicted as PROC 110 spans several columns of CLBs and BRAMs.

PROC 110 can be implemented as a hard-wired processor that is fabricated as part of the die that implements the programmable fabric of the IC. PROC 110 can represent any of a variety of different processor types and/or systems ranging in complexity from an individual processor, e.g., a single core capable of executing program code, to an entire processor system having a plurality of modules, co-processors, interfaces, and/or multiple cores. For example, PROC 110 can include one or more cores, e.g., central processing units, cache memories, a memory controller, unidirectional and/or bidirectional interfaces configurable to couple directly to I/O pins of the programmable IC and/or couple to the programmable fabric of the programmable IC. The phrase "programmable fabric" can refer to programmable circuitry within an IC, e.g., the various programmable or configurable circuit blocks described herein, as well as the interconnect circuitry that selectively couples the various circuit blocks and programmable tiles and/or elements according to configuration data that is loaded into the IC.

FIG. 1 is intended to illustrate only an exemplary architecture that can be used to implement a programmable IC. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual programmable IC, for example, more than one adjacent column of CLBs is typically included wherever the CLBs appear, to facilitate the efficient implementation of user logic. The number of adjacent CLB columns, however, can vary with the overall size of the programmable IC.

Figure 2:
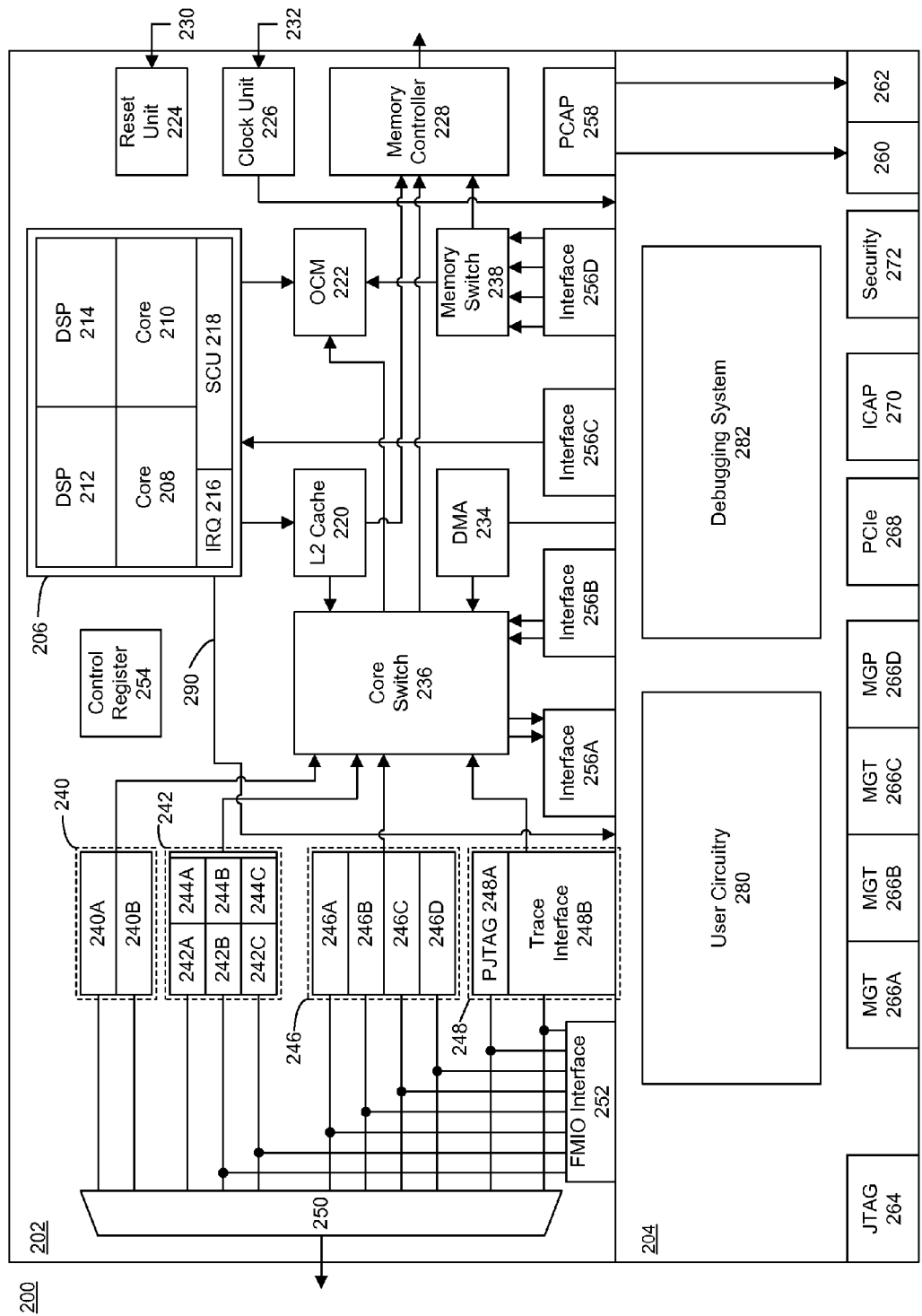
FIG. 2 is a second block diagram illustrating an IC configured in accordance with another embodiment disclosed within this specification.

FIG. 2 is a second block diagram illustrating an IC 200 configured in accordance with another embodiment disclosed within this specification. IC 200 can be implemented using any of a variety of different architectures that include a processor system (PS) 202 coupled to a programmable circuitry such as, e.g., a programmable fabric 204. For example, IC 200 can be implemented using an architecture that is the same as, or similar to, that of architecture 100 of FIG. 1, though this need not be the case. In the example shown in FIG. 2, PS 202 is illustrated as occupying approximately two-thirds of the die of IC 200, while programmable fabric 204 is shown as occupying approximately one-third of the same die. FIG. 2 is not, however, intended to be a scale representation of IC 200. Rather, FIG. 2 is provided for purposes of illustration and is not intended as a limitation of the one or more embodiments disclosed within this specification.

In general, PS 202 is implemented as a hard-wired system within IC 200. To the extent that various components or modules within PS 202 are coupled by lines, e.g., signal or communication links, that have arrows, such arrows are intended to illustrate the direction or flow of control. In this regard, a signal illustrated as a line with a directional arrow generally indicates that control over the signal is exerted by the source component from which the arrow emanates rather than the target component. The arrows, in general, are not intended to indicate one-way flow of data or directionality of the signal. In this regard, signals can be implemented as bi-directional signals or communication links despite the presence of the directional arrow.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal, as noted, may represent bi-directional communication between two, or more, components connected by that signal or wire as the case may be.

As shown, PS 202 can include a core complex 206. Core complex 206 can include cores 208 and 210, DSP units 212 and 214, an interrupt request unit (IRQ) 216, and a snoop control unit (SCU) 218. Each of cores 208 and 210 can include a level 1 (L1) cache (not shown) embedded therein. While any of a variety of different types of processor cores and/or DSP units can be used, in an embodiment disclosed herein, cores 208 and 210 can be implemented as ARM Cortex™-A9 type of processor cores with each having a 32 KB instruction cache and a 32 KB data cache. DSP units 212 and 214 can be implemented in the form of NEON™ media and/or floating point processing engines. Each DSP unit 212 and 214 can provide 128-bit vector-based DSP functions. Both the ARM Cortex™-A9 processor cores and the NEON™ media and/or floating point processing engines are available from ARM Holdings of Cambridge, UK (ARM).

Within PS 202, core complex 206 is coupled to a level 2 (L2) cache 220 and an on-chip memory (OCM) 222. L2 cache 220 can be implemented as a 256 KB memory. OCM 222 also can be implemented as a 256 KB memory. Cores 208 and 210 and DSP units 212 and 214 can directly access L2 cache 220 and OCM 222. In general, OCM 222 provides local memory that is available to PS 202 and/or to programmable fabric 204, e.g., circuits implemented within programmable fabric 204. By comparison, L2 cache 220, which is also a memory, functions as a cache for PS 202. Accordingly, L2 cache 220 can store small blocks or portions of data, e.g., 256 bits, which are effectively copies of data bits stored in RAM, e.g., execution memory for PS 202 located off-chip. If, for example, a read request is issued for data stored in L2 cache 220, the data is read from L2 cache 220 as opposed to being retrieved from the RAM.

PS 202 further can include a reset unit 224, a clock unit 226, and a memory controller 228. Reset unit 224 can receive one or more signals originating from a source external to IC 200, e.g., signal 230. Signal 230 can instruct reset unit 224 to reset PS 206 and/or one or more or all of the components within PS 202. Clock unit 226 also can receive one or more reference signals, e.g., signal 232, from a source external to IC 200. Clock unit 226, for example, can be implemented as, or include, phase-lock loop circuitry capable of synchronizing to received signal 232. Clock unit 226 can generate one or more clocking signals of one or more different frequencies that can be distributed throughout PS 202 (not shown). Further, clock module 226 can generate one or more clock signals of one or more different frequencies that can be distributed to programmable fabric 204 for use by circuits implemented therein.

Memory controller 228 can be implemented to communicate with one or more different types of RAMs located external to IC 200, e.g., "off-chip." For example, memory controller 228 can be implemented to communicate, e.g., read and/or write, various types of memory including, but not limited to, Dual Data Rate (DDR) 2, DDR3, Low Power (LP) DDR2 types of memory, whether 16-bit, 32-bit, 16-bit with ECC, etc. The list of different memory types with which memory controller 228 is able to communicate is provided for purposes of illustration only and is not intended as a limitation or to be exhaustive.

PS 202 includes a direct memory access (DMA) interface 234 that is coupled to a core switch 236 and to programmable fabric 204. PS 202 also includes a memory switch 238 that couples to one of interfaces 256, i.e., interface 256D, to be described within this specification in greater detail, OCM 222, and memory controller 228.

Core switch 236 can route signals among various components of PS 202 as shown. In an embodiment, core switch 236 can be coupled directly to an internal bus of PS 202 (not shown). In such an embodiment, each other component within PS 202 that connects with core switch 236 can be coupled to core switch 236 through the internal bus. For example, interfaces 240, 242, 246, and 248 each can couple to core switch 236 via the internal bus. The internal bus can be implemented as any of a variety of different buses such as, for example, an Advanced Peripheral Bus (APB).

In general, PS 202 can provide approximately four categories of input/output (I/O). PS 202 can provide flash memory type interfaces, higher performance interfaces, lower performance interfaces, and debugging interfaces. Regarding the first category of I/O, PS 202 can include one or more flash memory interfaces 240 illustrated as 240A and 240B. For example, one or more of flash memory interfaces 240 can be implemented as a Quad-Serial Peripheral Interface (QSPI) configured for 4-bit communication. One or more of flash memory interfaces 240 can be implemented as a parallel 8-bit NOR/SRAM type of interface. One or more of flash memory interfaces 240 can be implemented as a NAND interface configured for 8-bit and/or or 16-bit communication. It should be appreciated that the particular interfaces described are provided for purposes of illustration and not limitation. Other interfaces having different bit widths can be used.

Regarding the second category of I/O, PS 202 also can include one or more higher performance interfaces 242. Each of the higher performance interfaces 242A-242C can be coupled to a DMA controller 244A-244C respectively. For example, one or more of interfaces 242 can be implemented as a universal serial bus (USB) type of interface. One or more of interfaces 242 can be implemented as a gigabit Ethernet type of interface. One or more of interfaces 242 can be implemented as a Secure Digital (SD) type of interface.

Regarding the third category of I/O, PS 202 further can include one or more lower performance interfaces 246 such as interfaces 246A-246D. For example, one or more of interfaces 246 can be implemented as a General Purpose I/O (GPIO) type of interface. One or more of interfaces 246 can be implemented as a Universal Asynchronous Receiver/Transmitter (UART) type of interface. One or more of interfaces 246 can be implemented in the form of a Serial Peripheral Interface (SPI) bus type of interface. One or more of interfaces 246 can be implemented in the form of a Controller-Area-Network (CAN) type of interface. One or more of interfaces 246 can be implemented in the form of a Triple Timer Counter (TTC) and/or a Watchdog Timer (WDT) type of interface.

Regarding the last category of I/O, PS 202 can include one or more debug ports 248 such as processor JTAG (PJTAG) port 248A and a trace interface 248B. PJTAG port 248A provides an external debug interface for PS 202. Trace interface 248B provides a port to receive debug, e.g., trace, information from programmable fabric 204, a port to send debugging data of PS 202 out to programmable fabric 204, and a cross trigger port. The cross trigger port allows circuitry within programmable fabric 204 to trigger debug functions such as trace within PS 202. Similarly, PS 202 can initiate debug functions within circuits implemented within programmable fabric 204.

As shown, each of interfaces 240, 242, 246, and 248 can be coupled to a multiplexer 250. Multiplexer 250 provides a plurality of outputs that can be directly routed or coupled to external pins of IC 200. For example, a plurality of I/O pins of IC 200, e.g., 53 pins, can be shared among interfaces 240, 242, 246, and 248. A user can configure multiplexer 250, as part of PS 202, to select which of interfaces 240-248 are to be used and, therefore, coupled to I/O pins of IC 200 via multiplexer 250.

As shown, interfaces 242-248 also can be selectively coupled to a fabric multiplexer input/output (FMIO) interface 252. Accordingly, based upon user configuration of IC 200 and, more particularly, PS 202, any one of I/O categories one, two, or three, i.e., interfaces 242-248, can be coupled to programmable fabric 204 of IC 200 via FMIO interface 252. This allows data being communicated via any one of interfaces 242-248 to be routed to circuitry within programmable fabric 204 for further processing and/or monitoring.

Control register 254 can be configured to control various, if not most, aspects of PS 202. One or more commands can be written to control register 254 to control or regulate operation of PS 202. For example, circuits within programmable fabric 204 can write to control register 254 through an interface such as interface 256B, to be described herein in further detail. Control register 254 can control or regulate functions such as controlling intellectual property (IP) enable resets, setting clock frequencies generated by clock unit 226, specifying I/O drive strength, and other system level functions. Control register 254 can regulate additional functions such as powering down PS 202, powering down or deactivating particular interfaces of PS 202 independently, or the like. Control register 254 can be accessed through a bus such as, for example, an Advanced Peripheral Bus (APB) (not shown), that couples control register 254 to core switch 236.

PS 202 also can include one or more interfaces 256, depicted as interfaces 256A-256D, that couple directly with programmable fabric 204. In an embodiment, one or more or all of interfaces 256 can be implemented in accordance with the AMBA AXI Protocol Specification (AXI) as published by ARM. For example, each of interfaces 256 can be implemented in conformance with the AMBA AXI Protocol Specification v.2.0, which is incorporated herein by reference in its entirety. In general, AXI is a high performance, high frequency interface that is suitable for submicron interconnect.

Referring again to FIG. 2, interfaces 256A and 256B, for example, each can be implemented to provide two, 32-bit channels that couple programmable fabric 202 with core switch 236. Interface 256A can be implemented as a general-purpose master interface. Interface 256B can be implemented as a general-purpose slave interface. As noted, each can be implemented as AXI type interfaces. Via interfaces 256A-256B and core switch 236, circuits implemented within programmable fabric 204 can access various ones of interfaces 240, 242, 246, and 248. Through interfaces 256A and/or 256B, in combination with core switch 236, circuits within programmable fabric 204 further can access OCM 222 directly, off-chip memory via memory controller 228, etc.

Interface 256C can be implemented as a 64-bit slave interface that couples programmable fabric 202 directly with core complex 206 and, more particularly SCU 218. Via interface 256C and SCU 218, circuits implemented within programmable fabric 204 are provided with direct access to L1 cache within each of cores 208 and 210, IRQ 216, L2 cache 220, and OCM 222. Accordingly, circuits within programmable fabric 204 can read and/or write to such memories and detect interrupts generated or asserted within core complex 206. In addition, signal 290 can represent one or more interrupts from programmable fabric 204 that can be provided to IRQ 216 as ports or signals and/or one or more copies of interrupts from PS 202, and in particular from core complex 206, that can be provided to programmable fabric 204 as ports or signals. In another embodiment, interface 256C can provide coherent access to core complex 206 that would be suitable for use by circuits functioning as co-processors. For example, a soft processor implemented within programmable fabric 202 can communicate with PS 202 via interface 256C.

Interface 256D can be implemented to provide a plurality, e.g., four, 64-bit slave interfaces. Interface 256D can be used to exchange large amounts of data between PS 202 and circuits implemented within programmable fabric 204 efficiently. As shown, interface 256D provides circuits implemented within programmable fabric 204 with access to OCM 222 via memory switch 238 and access to off-chip memory via memory switch 238 and memory controller 228.

PS 202 further includes a processor configuration access port (PCAP) 258. As shown, PCAP 258 can be coupled to a configuration controller 260 and a system monitor block 262 located within programmable fabric 204. Configuration controller 260 and system monitor block 262 can be implemented in the form of hard-wired circuitry. Configuration controller 260 is responsible for writing configuration data to configuration memory cells thereby physically implementing circuitry specified by the configuration data within programmable fabric 204. System monitor block 262 can perform functions such as analog-to-digital conversion, voltage monitoring, current monitoring, and/or temperature monitoring.

Programmable fabric 204 can be implemented to include one or more programmable circuit blocks that can be coupled together using programmable interconnect circuitry. The programmable circuit blocks and the programmable interconnect circuitry can be configured to implement one or more different physical circuits, e.g., user circuitry 280 and/or debugging system 282, based upon configuration data loaded into IC 200. It should be appreciated that programmable fabric 204, with the exception of various hard-wired circuits implemented therein, is not operational or functional until configuration data is loaded to implement physical circuitry therein.

Programmable fabric 204 also can be configured to implement one or more interfaces in the form of hard-wired circuits. For example, a JTAG interface 264, one or more MGTs 266A-266D, a Peripheral Component Interconnect Express (PCIe) interface 268, an Internal Configuration Access Port (ICAP) 270, and a security port 272 can be included as hard-wired circuits despite being located within the programmable fabric portion of IC 200. The various interfaces described with reference to programmable fabric 204 illustrate exemplary interfaces that can be implemented and are not intended to be restrictive or limiting as to the one or more embodiments disclosed within this specification.

For example, configuration data can be loaded into IC 200 and received by configuration controller 260. In an embodiment, configuration data can be received through PS 202, which can control the configuration process of IC 200. Configuration controller 260, which can be implemented as a hard-wired circuit within programmable fabric 204, can load the configuration data received from PS 202 via PCAP 258 within configuration memory (not shown) of IC 200. Different physical circuits such as user circuitry 280 and/or debugging system 282 can be implemented or formed within programmable fabric 202 as specified by the particular configuration data loaded into configuration memory of IC 200. It should be appreciated that the loading of configuration data in this manner, due to the use of hard-wired circuitry, requires no initial configuration of programmable fabric 204. Circuits implemented within programmable fabric 204 in consequence of loading configuration data, though physical circuits, typically are referred to as "soft" in that the circuitry is formed within the programmable fabric rather than being hard-wired or fixed within IC 200.

Figure 3:
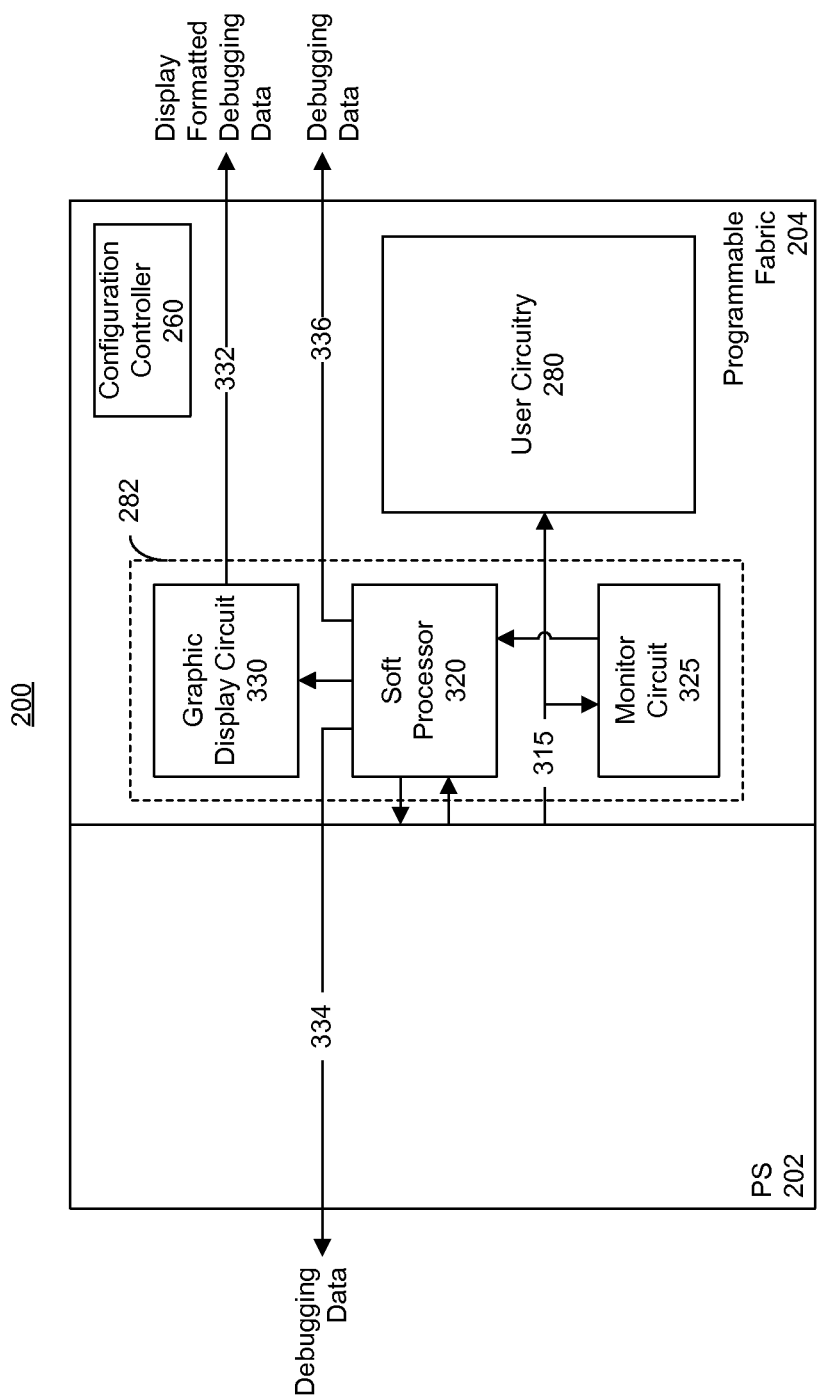
FIG. 3 is a third block diagram illustrating an IC configured for debugging in accordance with another embodiment disclosed within this specification.

FIG. 3 is a third block diagram illustrating an IC configured for debugging in accordance with another embodiment disclosed within this specification. FIG. 3 illustrates a more generalized view of IC 200 of FIG. 2. As shown, IC 200 includes PS 202 and programmable fabric 204. User circuitry 280 and debugging system 282 have been implemented within programmable fabric 204. Like numbers will be used to refer to the same items throughout this specification to the extent possible.

Debugging system 282 can include one or more components or modules such as a soft processor 320, one or more monitor circuits such as monitor circuit 325, and an optional graphic display circuit 330. Debugging system 282 can include various combinations and/or permutations of the modules noted as will be described herein in greater detail. Since each of soft processor 320, monitor circuit 325, and graphic display circuit 330 are implemented within programmable fabric 204 in consequence of loaded configuration data, each can be said to be a "soft" module specified by, or in the form of, a soft intellectual property (IP) core. In general, debugging system 282 provides a non-intrusive way to monitor and debug PS 202 as resources of PS 202 are not utilized or otherwise taxed for the debugging process.

Soft processor 320 can be configured to execute program code as does a hard processor. In an embodiment, soft processor 320 can be implemented as a MicroBlaze™ soft processor available from Xilinx, Inc. of San Jose, Calif. (Xilinx). Soft processor 320, for example, can be loaded with program code that is suited for debugging PS 202. For example, soft processor 320 within debugging system 282 can receive debug commands issued from a source external to IC 200, e.g., a remotely located source. The external source can issue one or more debug commands over a communication network from a location that is, or is not, local to IC 200 or the system within which IC 200 is disposed. Soft processor 320 can be coupled to PS 202 via one or more of the interfaces, e.g., interface 248 or 256, described with reference to FIG. 2. For example, soft processor 320 can couple to PS 202 via the PJTAG port 248A via FMIO interface 252, or the like.

User circuitry 280 can be coupled to PS 202 via signal 315. Signal 315, as implemented within programmable fabric 204, can be coupled to an interface, e.g., interface 248 and/or 256, of PS 202. Monitor circuit 325 can be implemented to monitor or detect the occurrence of a trigger event on signal 315. Responsive to detecting a trigger event, monitor circuit 325 can notify or signal soft processor 320 to initiate one or more enumerated functions, e.g., debugging activities or the like. In the configuration shown, debugging system 282 can monitor events on one or more of the interfaces of PS 202 in real-time, e.g., during normal operation of PS 202. In one example, responsive to detecting a trigger event, soft processor 320 can initiate a trace function within PS 202. Debugging data, i.e., trace data, can be output to soft processor 320 via one of the interfaces, e.g., trace interface 248B. Soft processor 320 and/or another circuit implemented as part of debugging system 282 can filter or otherwise process the received trace data from PS 202.

Graphic display circuit 330 can be coupled to soft processor 320. Graphic display circuit 330 can receive information from soft processor 320 that is to be output from IC 200. Graphic display circuit 330 can format, or otherwise process, data received from soft processor 320 for presentation upon a display device that is coupled locally to either IC 200 or a system within which IC 200 is disposed. As such, the display device coupled to IC 200 can be driven directly by IC 200 via signal 332 without the need for any additional video processing circuitry. For example, graphic display circuit 330 can output signal 332, which can be encoded as video. As used herein, "outputting" and/or "output" can mean, for example, writing to a file, writing to a user display or other output device, storing in memory, sending or transmitting to another system, exporting, or the like.

In the example pictured in FIG. 3, soft processor 320 also can be configured to output data through PS 202. For example, soft processor 320 can provide debugging data via signal 334 through one of interfaces 256 and output the debugging data through memory controller 228 or one of I/Os 240, 242, 246, and/or 248. In another example, soft processor 320 can be configured to output data via an interface implemented within programmable fabric 204 as shown. For instance, soft processor 320 can output debugging data over signal 336 over an Ethernet type of interface or an MGT implemented within programmable fabric 204 for communicating with one or more systems external to IC 200.

In another embodiment, debugging system 282 can facilitate remote self-hosted debugging. When IC 200 is deployed in the field, implementing debug functions for PS 202, such as trace, can be difficult as such functions require connectivity to a trace box that may not be physically possible or financially feasible to couple to IC 200 or PS 202. Circuitry within programmable fabric 204, e.g., one or more components within debugging system 282, can be used to monitor and control PS 202 functions under control of a remotely located source. Debugging system 282, for example, can control trace configuration of PS 202, run debugging software, and provide built-in debugging capability without the need for external debugging hardware devices.

When IC 200 is coupled to other systems via a communication link, e.g., Ethernet or USB, PS 202 can be observed by one or more components of debugging system 282. In another example, debugging system 282 can monitor PS 202 operation and send information observed from PS 202 over the communication link to the other system for further processing. Circuitry, e.g., debugging system 282, can drive PJTAG port 248A illustrated in FIG. 2 to directly drive debug functions within PS 202 responsive to commands received from the source external to IC 200.

In another embodiment, configuration abilities of programmable fabric 204 can be leveraged to facilitate the implementation of specialized, e.g., user-defined, debugging systems and/or circuitry. For example, responsive to detecting a particular trigger event within IC 200, e.g., whether within PS 202 or within programmable fabric 204, configuration data can be downloaded by PS 202 and provided to configuration controller 260 to implement a debugging system specified by the downloaded configuration data. Thus, in one aspect, debugging system 282 can be implemented dynamically during operation of PS 202 and user circuitry 280 responsive to a detected trigger event. Through a process referred to as dynamic partial reconfiguration, debugging system 282 can be implemented within programmable fabric 204 without interrupting operation of PS 202 or other circuitry implemented within programmable fabric 204 such as user circuitry 280. In that case, any debugging program code executed by soft processor 320 can be downloaded as part of that configuration data and loaded into an execution memory within programmable fabric 204 that is used by soft processor 320. Once soft processor 320 is implemented within programmable fabric 204, soft processor 320 can execute the debugging program code from the execution memory.

As noted, debugging system 282 can be implemented in different ways. For example, debugging system 282 can be configured to include only soft processor 320. Graphic display circuit 330 can be optional and implemented only when the ability to drive a local display device, e.g., a monitor, to view debugging data is needed. Monitor circuit 325 can be implemented without soft processor 320 and/or graphic display circuit 330 to detect the occurrence of particular conditions and output either observed data or generate a signal indicating that a particular trigger event has been detected. Thus, debugging system 282 can take on any of a variety of different forms whether dynamically implemented responsive to a detected operating state or initially implemented as part of, and concurrently with, user circuitry 280.

Referring to the various interfaces that couple PS 202 to programmable fabric 204 described with reference to FIG. 2, circuitry such as debugging system 282 within programmable fabric 204 can monitor various elements of PS 202 directly. For example, debugging system 282 can monitor interrupt requests within PS 202, each of the various interfaces 256, one or more of interfaces 242, 246, and/or 248 that may be routed into programmable fabric 204 via FMIO interface 252, or the like.

In another embodiment, one or more test signals that are typically available only for testing of IC 200, e.g., testing by the manufacturer, but not otherwise available to end users, can be coupled to programmable fabric 204. In a debug mode, for example, such test signals can be made available to programmable fabric 204 so that one or more monitor circuits as described with reference to FIG. 3 can be implemented to observe selected ones of the test signals for predetermined events.

Figure 4:
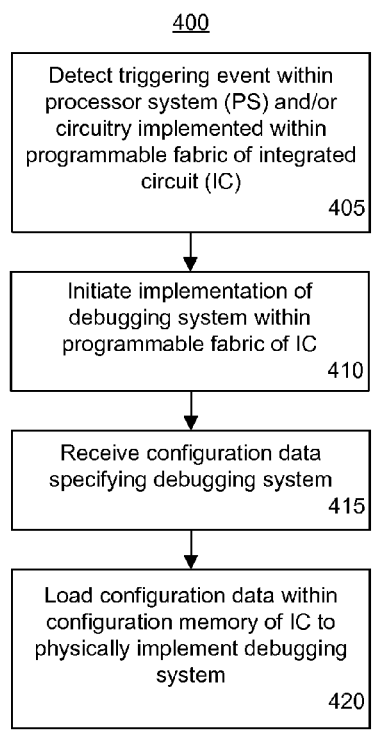
FIG. 4 is a first flow chart illustrating a method of initiating debug functions within an IC in accordance with another embodiment disclosed within this specification.

FIG. 4 is a first flow chart illustrating a method 400 of initiating debug functions within an IC in accordance with another embodiment disclosed within this specification. Method 400 can be implemented by an IC having a PS and a programmable fabric as described with reference to FIGS. 1-3 of this specification. Method 400 can begin in a state where a monitor circuit has been implemented within the programmable fabric in conjunction with user circuitry. The monitor circuit can monitor one or more signals to detect the occurrence of a trigger condition during normal operation within the IC, e.g., when in the field. The signals that are monitored can be signals routed to the monitor circuit from the PS or from one or more other circuits implemented and operating within the programmable fabric.

Accordingly, beginning in step 405, a trigger event within the PS or circuitry within the programmable fabric, e.g., user circuitry, can be detected. Detection of the trigger event can indicate the need for debugging of the PS. In another example, the monitor circuit can be configured to output data sampled from the PS and/or circuitry within the programmable fabric to a destination external to the IC. In that case, the system that receives the output data can evaluate the data and determine whether a trigger event has been detected. Accordingly, the trigger event can be detected external to the IC. For example, a network can record that a particular node is dropping packets at an unusual rate and initiate debugging of the node, e.g., in this case the IC including the PS and the programmable fabric. In another example, an initial debug session can identify a particular subsystem causing a new configuration for the programmable fabric, e.g., new circuitry, to be downloaded and implemented to monitor the identified subsystem.

In step 410, the implementation of a debugging system within the programmable fabric of the IC can be initiated. For example, responsive to detecting the trigger event, the monitor circuit can be configured to output a request for configuration data specifying a debugging system. In another example, the system external to the IC can send an instruction accompanied by configuration data specifying a debugging system responsive to detecting a trigger event. In still another example, the trigger event can select from one or more prebuilt debugging configurations, e.g., systems, that can be implemented within the programmable fabric.

For example, each of a plurality of different triggering events can be associated with a selected or particular debugging system. Each of the debugging systems can be specifically tailored to debug a type of condition associated with, or specified by, the triggering event with which each respective debugging system is associated. Thus, the triggering event can specify one of a plurality of different debugging systems to be implemented within the programmable fabric and the particular debugging system that is implemented can be situation, e.g., triggering event, specific.

In any case, in step 415, the IC can receive the configuration data specifying the debugging system. For example, the PS can receive or download the configuration data. The PS can provide the configuration data to the configuration controller. The configuration controller within the IC, in step 420, can load the configuration data within the configuration memory of the IC. Loading the configuration data within the configuration memory physically implements the debugging system within the programmable fabric.

In an embodiment, the programmable fabric can be entirely reconfigured. For example, any user circuitry implemented within the programmable fabric can discontinue normal operation. The debugging system can be implemented within the programmable fabric. Once implemented, the debugging system can begin to operate to debug the PS.

In another embodiment, circuitry within the programmable fabric can continue to operate as normal and the debugging system can be implemented using a process referred to as dynamic partial reconfiguration. Through dynamic partial reconfiguration, the debugging system can be implemented in conjunction with any user specified circuitry within the programmable fabric. The user specified circuitry can continue normal operation uninterrupted by implementation of the debugging system. In either case, whether through dynamic partial reconfiguration or by entirely reconfiguring the programmable fabric, the PS can continue operation uninterrupted. It should be appreciated, however, that if so desired, operation of the PS can be halted or paused.

Figure 5:
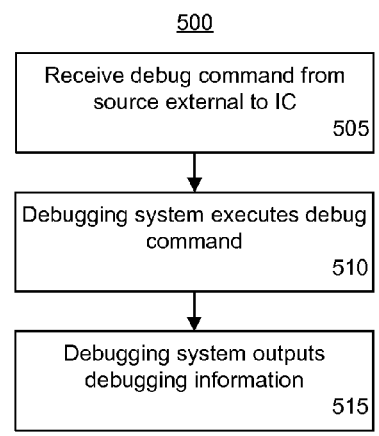
FIG. 5 is a second flow chart illustrating a method of initiating debug functions within an IC in accordance with another embodiment disclosed within this specification.

FIG. 5 is a second flow chart illustrating a method 500 of initiating debug functions within an IC in accordance with another embodiment disclosed within this specification. Method 500 can be implemented by an IC having a PS and a programmable fabric as described with reference to FIGS. 1-4 of this specification. Method 500 can begin in a state where a debugging system has been implemented within the programmable fabric, whether initially implemented as part of user circuitry, implemented through a dynamic process as described, etc.

Accordingly, in step 505, the debugging system can receive a debug command from a source external to the IC. The debug command can be received via one or more of the interfaces available within the programmable fabric or the PS. In step 510, the debugging system can execute the debug command. The debugging system can initiate or implement a debug function in consequence of executing the debug command. For example, the debugging system can instruct the PS to implement a trace function and begin exporting trace data to the programmable fabric for storage therein, filtering, export to a system external to the IC, or other processing within circuitry implemented within the programmable fabric. Other examples of actions taken in executing the debug command can include, but are not limited to, monitoring communications on a selected interface of the PS, monitoring interrupt requests, testing memory such as OCM, L1 cache, or L2 cache of the PS, or the like. In another example, the debugging system can route a received debug command to the PS via the PJTAG interface, e.g., via the FMIO interface. Accordingly, the various test functions described can be invoked from a remote source external to the IC that can be located a sizable distance from any system in which the IC is located.

In step 515, the debugging system can output debugging data. As noted, any data collected or processed by the debugging system can be formatted and output via a selected interface, whether a UART, Ethernet, USB, an MGT, or the like. In an embodiment, data can be formatted for viewing or rendering upon a local display device using graphic display circuitry implemented within the programmable fabric. The ability to output debugging data as described effectively places an "in-circuit emulation" system within the IC that can export data to remotely located systems to facilitate debugging remotely as described or display information upon a display device locally without the need for extraneous equipment beyond the IC itself. Accordingly, the PS effectively can be debugged from virtually anywhere that can be coupled to the IC via a communication link.

In another embodiment, functionality as is available within ChipScope, available from Xilinx, can be used or integrated with the debugging system. In general, ChipScope provides logic analyzer functionality in which one or more cores can be integrated with an existing user circuit design and implemented within the programmable fabric in a unified way. The ChipScope cores that are integrated into the user circuit design can output signals from one or more interfaces of the IC for evaluation within a system external to the IC. For example, one or more such IP cores can be integrated with an existing user circuit and reloaded into the IC through a conventional configuration process or a dynamic partial reconfiguration process for implementation within the programmable fabric. The resulting user circuit design with the integrated IP cores can implement the debugging system functionality described.

One or more embodiments disclosed within this specification provide debugging architectures that can be implemented within an IC that includes an embedded processor system. The debugging architectures are flexible in that the architectures can be dynamically implemented during operation of the IC without interfering with operation of the processor system. Further, the debugging architectures facilitate remote debugging of the processor system within the IC thereby allowing diagnostic and/or corrective measures to be taken after the IC is deployed in the field.

The flowcharts in the figures illustrate the architecture, functionality, and operation of possible implementations of systems, methods and computer program products according to one or more embodiments disclosed within this specification. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments can be realized in hardware or a combination of hardware and software. One or more embodiments can be realized in a centralized fashion in one system or in a distributed fashion where different elements are spread across several interconnected systems. Any kind of data processing system or other apparatus adapted for carrying out at least a portion of the methods described herein is suited.

One or more embodiments further can be embedded in a device such as a computer program product, which comprises all the features enabling the implementation of the methods described herein. The device can include a data storage medium, e.g., a non-transitory storage medium such as a computer-usable or computer-readable medium, storing program code that, when loaded and executed in a system comprising memory and a processor, causes the system to perform at least a portion of the functions described within this specification. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method of debugging an integrated circuit, the method comprising:
    detecting a trigger condition within a monitor circuit of the integrated circuit during operation;
    responsive to the trigger condition, a processor system of the integrated circuit downloading configuration data specifying at least one module of a debugging system and dynamically reconfiguring a portion of the integrated circuit to implement the at least one module of the debugging system using the configuration data;
    receiving, within the debugging system implemented within the integrated circuit, a debug command from a system external to the integrated circuit; and
    responsive to the debug command, initiating a debug function specified by the debug command for the processor system embedded on the integrated circuit.

2. The method of claim 1, further comprising:
    formatting debugging data from implementation of the debug function of the processor system for presentation on a display device locally coupled to the integrated circuit.

3. The method of claim 1, wherein initiating a debug function further comprises:
    from the debugging system, testing a memory within the processor system.

4. The method of claim 1, wherein, responsive to the trigger condition, the method further comprises:
    the monitor circuit issuing a request for the configuration data for the debugging system, wherein the request specifies a selected debugging system from a plurality of debugging systems according to the trigger condition; and
    implementing the selected debugging system as the debugging system within the integrated circuit.

5. The method of claim 1, wherein initiating a debug function further comprises:
    from the debugging system, directly monitoring interrupts of the processor system.

6. The method of claim 1, further comprising:
    sending, from the integrated circuit, the detected trigger condition to a system external to the integrated circuit and, in response, receiving, from the system external to the integrated circuit, the configuration data specifying a debugging system selected from a plurality of debugging systems according the trigger condition; and
    implementing the debugging system as the debugging system within the integrated circuit.

7. The method of claim 1, wherein the at least one module is a soft processor executing debugging program code specified by the configuration data.

8. The method of claim 1, further comprising:
    receiving debugging data from the processor system within the debugging system, wherein the debugging system is implemented within a programmable fabric of the integrated circuit that is coupled to the processor system; and
    sending the debugging data from a communication port of the integrated circuit to a system external to the integrated circuit.

9. An integrated circuit comprising:
    a programmable circuitry configurable to implement physical circuits;
    a processor system, wherein the processor system is hard-wired;
    an interface configured to couple the programmable circuitry with the processor system, wherein the interface provides the programmable circuitry with direct access to at least one internal component of the processor system;
    a monitor circuit implemented within the programmable circuitry configured to detect a trigger condition and, in response, obtain configuration data specifying at least one module of a debugging system; and
    a configuration controller that, responsive to receiving the configuration data specifying the debugging system, dynamically implements the debugging system within the programmable fabric.

10. The integrated circuit of claim 9,
    wherein the debugging system is configured to initiate a trace function within the processor system.

11. The integrated circuit of claim 10, wherein the debugging system is configured to implement the debug function responsive to a debug command received from a source external to the integrated circuit.

12. The integrated circuit of claim 11, wherein the debugging system comprises a graphic display circuit configured to format debugging data from the processor system from implementing the debug function for presentation upon a display device locally coupled to the integrated circuit.

13. The integrated circuit of claim 10, wherein the debugging system comprises a soft processor, wherein the soft processor is configured to execute debug program code.

14. The integrated circuit of claim 13, wherein the debug program code to be executed by the soft processor is provided with the configuration data specifying the debugging system.

15. The integrated circuit of claim 9, wherein:
    the monitor circuit sends the detected trigger condition to a system external to the integrated circuit and, in response, the integrated circuit receives, from the system external to the integrated circuit, the configuration data specifying a debugging system selected from a plurality of debugging systems according the trigger condition; and
    the configuration controller implements the debugging system as the debugging system within the integrated circuit.

16. The integrated circuit of claim 9, wherein:
    the monitor circuit issues a request for the configuration data for the debugging system, wherein the request specifies a selected debugging system from a plurality of debugging systems according to the trigger condition; and the configuration controller implements the selected debugging system as the debugging system within the integrated circuit.

17. An integrated circuit comprising:

a programmable fabric configurable to implement physical circuits comprising a monitor circuit configured to detect a trigger condition;

a configuration controller configured to receive configuration data specifying physical circuits for implementation within the programmable fabric;

a processor system, wherein the processor system is hard-wired; and an interface configured to couple the programmable fabric with the processor system, wherein the configuration controller is configured to implement at least one module of a debugging system for the processor system within the programmable fabric responsive to receiving configuration data specifying the debugging system;

wherein the debugging system is selected from a plurality of different debugging systems according to the trigger condition; and wherein the debugging system communicates with the processor system via the interface.

18. The integrated circuit of claim 17, wherein the debugging system is configured to implement debug functions responsive to debug commands received from a source external to the integrated circuit.

\* \* \* \* \*